United States Patent [19]

Harris et al.

[11] Patent Number: 4,556,700
[45] Date of Patent: Dec. 3, 1985

[54] INSTANT ADHESIVE COMPOSITION UTILIZING CALIXARENE ACCELERATORS

[75] Inventors: Stephen J. Harris; M. Anthony McKervey; David P. Melody; John Woods, all of Dublin; John M. Rooney, Kildare, all of Ireland

[73] Assignee: Loctite Limited, Dublin, Ireland

[21] Appl. No.: 673,621

[22] Filed: Nov. 21, 1984

Related U.S. Application Data

[63] Continuation-in-part of Ser. No. 575,257, Jan. 30, 1984, abandoned.

[51] Int. Cl.[4] .............................. C08F 4/00; C08F 20/34
[52] U.S. Cl. .................................... 526/209; 526/208; 526/245; 526/285; 526/292.2; 526/298; 526/299
[58] Field of Search ............... 526/208, 209, 213, 216, 526/285, 292.2, 298, 299, 245

[56] References Cited

U.S. PATENT DOCUMENTS

| | | | |
|---|---|---|---|
| 3,393,183 | 6/1968 | Kimura et al. | 526/245 |
| 4,042,442 | 8/1977 | Dombroski et al. | 156/310 |
| 4,171,416 | 10/1979 | Motegi et al. | 526/245 |
| 4,182,823 | 1/1980 | Schoenberg | 526/298 |
| 4,196,271 | 4/1980 | Yamada et al. | 525/242 |
| 4,321,180 | 3/1982 | Kimura et al. | 524/549 |
| 4,386,193 | 5/1983 | Reich et al. | 526/298 |
| 4,425,471 | 1/1984 | Millet | 526/298 |
| 4,477,377 | 10/1984 | Izatt et al. | 252/631 |

OTHER PUBLICATIONS

Gutsche, et al., "Calixarenes.4. The Synthesis, Characterization, and Properties of the Calixarenes from P-tert-butylphenol", JACS 103 3782-3792 (1981).

Gutsche, "Calixarenes", Acc. Chem. Res., 16 161-170 (1983).

Muthukrishnan et al., "Calixarenes.3. Preparation of the Dinitrophenyl and Canphorsulfonyl Deiviatives of the Calix[8]arene from P-tert-Butylphenol", J. Org. Chem., 44 3962-3963 (1979).

*Primary Examiner*—Harry Wong, Jr.
*Attorney, Agent, or Firm*—Walter J. Steinkraus; Eugene F. Miller

[57] ABSTRACT

Cyanoacrylate adhesive compositions which employ calixarene compounds as additives give substantially reduced fixture and cure times on de-activating substrates such as wood. The calixarene compounds are preferably employed at levels of about 0.1-1% by weight of the composition.

The calixarene compounds particularly useful in this invention may be represented by the formula:

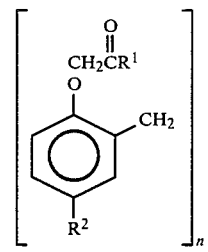

where $R^1$ is alkyl, alkoxy, substituted alkyl or substituted alkoxy; $R^2$ is H or alkyl; and n=4, 6 or 8.

7 Claims, No Drawings

INSTANT ADHESIVE COMPOSITION UTILIZING CALIXARENE ACCELERATORS

This application is a continuation-in-part of Ser. No. 575,257, filed Jan. 30, 1984, now abandoned.

BACKGROUND OF THE INVENTION

In DE-OS No. 2,816,836, dated Oct. 26, 1978 there are described cyanoacrylate adhesive compositions which employ crown ethers as polymerization accelerators. Such compositions are useful for bonding acidic surfaces such as wood which inhibit cyanoacrylate polymerization.

Crown ethers, however, are known to be very toxic, the reported effects of exposure including damage to the central nervous system and testicular atrophy. Leong, B.K.J., Chem. Eng. News, 53, 5(1975). Furthermore, such accelerators are reportedly very difficult to synthesize, supplying the desired product in only low yields because of the tendency to produce intermolecular linkages. Accordingly, there is a need for alternative cyanoacrylate accelerators suitable for wood bonding applicators.

In U.S. Pat. No. 4,170,585, there are described cyanoacrylate compositions in which certain polyethylene glycols or poly(ethyleneoxy) functional surfactants act as wood bonding accelerators. Such compounds, however, have the reported disadvantage that they tend to contain water and other difficult to remove substances which spontaneously initiate polymerization of the cyanoacrylate monomer.

U.S. Pat. No. 4,377,490 discloses mixtures of aromatic and aliphatic polyols and polyethers said to improve initial strength of cyanoacrylate wood bonding products.

U.S. Pat. No. 4,386,193 discloses certain 3 or 4 arm polyol podand compounds as alternatives to crown-ether accelerators.

Japan Kokai Tokkyo Koho 82-70171, suggests the use of certain polyorganosiloxane compounds which include polyether substituents as additives for wood bonding cyanoacrylate compositions.

Chem. Abstracts, 97 145913n reports the use of a hydroxy-terminated poly(dimethylsiloxane) in fast bonding cyanoacrylate compositions.

DE-OS No. 3,006,071 discloses certain furan derivatives as co-accelerators with crown ethers in cyanoacrylate compositions.

SUMMARY OF THE INVENTION

The present invention is a new cyanoacrylate composition for bonding wood and other de-activating surfaces such as leather, ceramic, plastics and metals with chromate treated or acidic oxide surfaces. The inventive compositions are standard cyanoacrylate adhesive formulations to which have been added, as accelerators, certain calixarene compounds stable to cyanoacrylate monomers. The calixarene compounds are preferably employed at levels between about 0.1% and 1% by weight of the composition.

The calixarene compounds particularly useful in the invention may be represented by the formula:

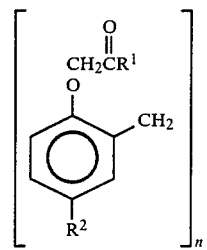

where $R^1$ is alkyl, alkoxy, substituted alkyl or substituted alkoxy; $R^2$ is H or alkyl; and n=4, 6, or 8.

DETAILED DESCRIPTION OF THE INVENTION

The α-cyanoacrylate-type adhesive composition of this invention as described above contains an α-cyanoacrylate monomer of the formula:

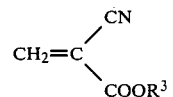

wherein $R^3$ represents a straight chain or branched chain alkyl group having 1 to 12 carbon atoms (which may be substituted with a substituent such as a halogen atom or an alkoxy group) a straight chain or branched chain alkenyl group having 2 to 12 carbon atoms, a straight chain or branched chain alkynyl group having 2 to 12 carbon atoms, a cycloalkyl group, an aralkyl group or an aryl group. Specific examples of the groups for $R^3$ are a methyl group, an ethyl group, an n-propyl group, an isopropyl group, an n-butyl group, an isobutyl group, a pentyl group, a hexyl group, an allyl group, a methallyl group, a crotyl group, a propargyl group, a cyclohexyl group, a benzyl group, a phenyl group, a cresyl group, a 2-chloroethyl group, a 3-chloropropyl group, a 2-chlorobutyl group, a trifluoroethyl group, a 2-methoxyethyl group, a 3-methoxybutyl group and a 2-ethoxyethyl group. Ethyl cyanoacrylate is the preferred monomer for use in the inventive compositions.

A single α-cyanoacrylate monomer or a mixture of two or more of these α-cyanoacrylate monomers can be used. Generally, the above α-cyanoacrylate monomer alone is not sufficient as an adhesive, and the components set forth below are sometimes added.

(1) An anionic polymerization inhibitor
(2) A radical polymerization inhibitor
(3) A thickener
(4) Special additives such as plasticizers and heat stabilizers
(5) Perfumes, dyes, pigments, etc.

A suitable amount of the α-cyanoacrylate monomer present in the adhesive composition is about 80 to 99.9% by weight, preferably 90 to 99.9% by weight, based on the total weight of the adhesive composition.

An anionic polymerization inhibitor is added to the α-cyanoacrylate-type adhesive composition, e.g., in an amount of about 1 to 1000 ppm based on the total weight of the adhesive composition, to increase the stability of the adhesive composition during storage, and examples of known inhibitors are sulfur dioxide, aromatic sulfonic acids, aliphatic sulfonic acids, sultones, and carbon dioxide.

Suitable examples of radical polymerization inhibitors include, for example, hydroquinone and hydroquinone monomethyl ether. A radical polymerization inhibitor is added, e.g., in amount of about 1 to 5000 ppm based on the total weight of the adhesive composition, for the purpose of capturing radicals which are formed by light during storage.

A thickener is added to increase the viscosity of the α-cyanoacrylate-type adhesive composition. The α-cyanoacrylate monomer generally has a low viscosity of about several centipoises, and therefore, the adhesive penetrates into porous materials such as wood and leather or adherends having a rough surface. Thus, good adhesion strengths are difficult to obtain. Various polymers can be used as thickeners, and examples include poly(methyl methacrylate), methacrylate-type copolymers, acrylic rubbers, cellulose derivatives, polyvinyl acetate and poly(α-cyanoacrylate). A suitable amount of thickener is generally about 20% by weight or less based on the total weight of the adhesive composition.

As disclosed in the copending application of Alan Litke, Ser. No. 528,275, filed Aug. 31, 1983, now U.S. Pat. No. 4,477,607, certain fumed silica fillers treated with polydialkylsiloxanes or trialkylsilanes may also be usefully employed as cyanoacrylate thickeners.

The plasticizers, perfumes, dyes, pigments, etc., may be added depending on use purposes in amounts which do not adversely affect the stability of the α-cyanoacrylate monomer. The use of such additives is within the skill of those practicing in the cyanoacrylate adhesive art and need not be detailed herein.

Calixarene compounds are known and may be readily synthesized by methods described in C. Gutsche, Acc. Chem. Res., 16, 161–170 (1983), and references cited therein, the appropriate disclosures of which are incorporated herein by reference. Synthesis methods for the calixarene compounds which are preferred for use in the invention are exemplified in Examples 1 and 2 herein. The preferred compounds may be represented by formula I wherein $R^1$ is $OC_2H_5$, $R^2$ is H or t-butyl and n=4 or 6. Other suitable compounds include those of formula I where $R^1$ is methoxy or methyl.

The invention may be further understood with reference to the following non-limiting examples.

EXAMPLE 1

Synthesis of 25,26,27,28-Tetra-(2-oxo-2-ethoxy)-ethoxy calix[6]arene

In a 1-liter flask equipped with a Dean-Stark trap, 30 grams of para-tert-butyl phenol, 12 grams of paraformaldehyde, 18 mls of a 5N aqueous solution of rubidium hydroxide and 300 mls of xylene were refluxed for 5 hours. The cooled precipitate was filtered and suspended in 900 mls of chloroform and washed with 300 mls of 1N aqueous solution of hydrochloric acid. The organic layer was separated, washed with water, dried over magnesium sulfate, and concentrated to 300 mls. Methanol was added to yield a precipitate which represented a 52% yield of hexamer.

A mixture of 6.48 grams of hexamer and excess sublimed aluminum chloride was stirred overnight in dry toluene under a nitrogen atmosphere. Water was added to destroy the excess aluminum chloride and toluene was removed on a rotary evaporator. The crude orange oil was dissolved in 300 ml dichloromethane and washed with dilute acid followed by water to remove inorganic salts. The dichloromethane was removed under reduced pressure and diethyl ether added to the residue. A precipitate was collected, filtered and washed with ether. The remaining powder represented an 88% yield.

This powder (3.75 grams) was added to 8 mls of ethyl bromoacetate and excess potassium carbonate and refluxed in dry acetone for 48 hours. Removal of solvent and washing with water produced a 78% yield of crude product. Recrystallization from a benzene/petroleum ether mixture yielded white crystals. Analysis: Calculated, C: 68.75%, H: 6.25%; Found, C: 66.61%, H: 6.28%. NMR: $^1H(CDCl_3)$, $\delta = 6.75$ multiplet, 3H, $\delta = 4.2, 4.05$, multiplet, 6H, $\delta = 1.2$, triplet, 3H.

EXAMPLE 2

25,26,27,28-Tetra-(2-oxo-2-ethoxy)-ethoxy calix[4]arene was prepared by an analogous procedure, using sodium hydroxide in place of rubidium hydroxide in the first step.

EXAMPLE 3

To a commercially available cyanoacrylate-based adhesive (Loctite 495, sold by Loctite Corporation, Newington, Conn.) 0.1% by weight of 37,38,39,40,41,42-hexa-(2-oxo-2-ethoxy)-ethoxy calix[6]arene (HECA) was added. White deal wood lap shears were bonded on a 1.25 cm overlap with the compositions and fixture times measured. Fixture time was taken as the time at which the bond was no longer separable by hand. The untreated 495 adhesive gave a fixture time of between 20 and 25 minutes. The adhesive containing 0.1% HECA gave a fixture time of between 3 and 5 minutes. The HECA-containing composition exhibited storability of greater than 48 hours at 82° C.

EXAMPLE 4

The test in Example 3 was repeated using ramin wood lap shears as the substrates. The untreated 495 adhesive gave a fixture time of 45–55 seconds. The adhesive containing 0.1% HECA gave a fixture time 5–10 seconds.

EXAMPLE 5

The test in Example 3 was repeated using 25,26,27,28-Tetra-(2-oxo-2-ethoxy)-ethoxy calix[4]arene (TECA) as an additive to Loctite 495. The adhesive containing 0.1% TECA gave a fixture time of 5–10 minutes. Adhesive containing 1.0% TECA gave a fixture time of 5 minutes.

EXAMPLE 6

Leather lap shears were bonded with adhesive compositions and fixture times were measured. Loctite 495 adhesive gave a fixture time of 5–6 minutes. Adhesive containing 0.1% HECA gave a fixture time of 2–2½ minutes. Adhesive containing 0.1% TECA gave a fixture time of 1½–2 minutes.

EXAMPLE 7

The test in Example 3 was repeated using 5,11,17,23,29,35,41,47-octa-tert-butyl-49,50,51,52,53,54,55,56-octa-(2-oxo-2-ethoxy)-ethoxy calix[8]arene (OECA) as an additive to Loctite 495. The adhesive containing 0.1% OECA gave a fixture time of 10 minutes. Adhesive containing 1.0% OECA gave a fixture time of 5–10 minutes.

EXAMPLE 8

Synthesis 5,11,17,23-tetra-tert-butyl-25,26,27,28-tetra(2-oxo-2-ethoxy)ethoxy calix[4]arene A mixture of 1.62 g of 5,11,17,23-tetra-tert-butyl-25,26,27,28-tetrahydroxy calix[4]arene, 3.34 g ethyl bromoacetate, 2.07 g anhydrous potassium carbonate, and 50 milliters of dry acetone was refluxed under nitrogen for 14 days. At the end of this time the mixture was poured into 250 milliters of a 10% solution of aqueous hydrochloric acid. The precipitated solid was filtered, washed with distilled water and dried overnight at 55° C. to yield 2.4 g of crude product. Recrystallization of this material from hot ethanol gave 1.35 g of a colorless crystalline product which was characterized by i.r. and n.m.r. spectroscopy and crystallography as 5,11,17,23-tetra-tert-butyl-25,26,27,28-tetra(2-oxo-2-ethoxy)ethoxy calix[4]arene (M.Pt.=150°-151° C.).

We claim:

1. In a cyanoacrylate adhesive composition, the improvement comprising that the composition includes an accelerator compound in a conventional amount, the accelerator compound being a calixarene compound stable to cyanoacrylate monomers represented by the formula:

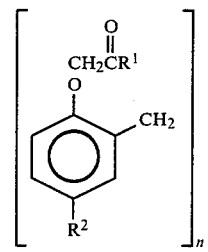

where an $R^1$ is alkyl, alkoxy substituted alkyl or substituted alkoxy; $R^2$ is H or alkyl; and n=4,6 or 8.

2. The composition of claim 1 wherein $R^1$ is $OCH_2CH_3$.

3. The composition of claim 1 wherein $R^2$ is H and n=4 or 6.

4. The composition of claim 1 wherein $R^2$ is t-butyl.

5. The composition of claim 1 wherein the cyanoacrylate adhesive composition contains a monomer of the formula:

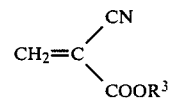

wherein $R^3$ represents a substituted or unsubstituted straight chain or branched chain alkyl group having 1 to 12 carbon atoms, a straight chain or branched chain alkenyl group having 2 to 12 carbon atoms, a straight chain or branched chain alkynyl group having 2 to 12 carbon atoms, a cycloalkyl group, an aralkyl group or an aryl group.

6. The composition of claim 1 wherein said calixarene compound is present in the range of 0.1-1% by weight of the composition.

7. The composition of claim 1 further comprising an anionic polymerization inhibitor and a free radical polymerization inhibitor.

* * * * *

UNITED STATES PATENT OFFICE
CERTIFICATE OF CORRECTION

Patent No. 4,556,700                Dated December 3, 1985

Inventor(s) Stephen J. Harris, et al

It is certified that error appears in the above-identified patent and that said Letters Patent are hereby corrected as shown below:

The formula

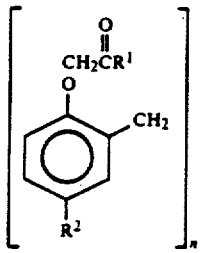

which appears in the abstract, at the top of column 2 (lines 1-12), and in Claim 1 (at the top of column 6), should be

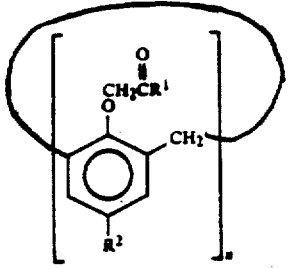

The nomenclature

"25,26,27,28-tetra-(2-oxo-2-ethoxy)-ethoxy calix[6]arene"

which appears at column 3, line 48, should be

--37,38,39,40,41,42-hexa-(2-oxo-2-ethoxy)-ethoxy calix[6]arene--.

UNITED STATES PATENT OFFICE
CERTIFICATE OF CORRECTION

Patent No. 4,556,700        Dated    December 3, 1985

Inventor(s)    Stephen J. Harris, et al

It is certified that error appears in the above-identified patent and that said Letters Patent are hereby corrected as shown below:

Column 5, line 4, after "synthesis" insert -- of --.

Signed and Sealed this

Fifth Day of August 1986

[SEAL]

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO.  : 4,556,700
DATED       : December 3, 1985
INVENTOR(S) : Stephen J. Harris, et al It is certified that error appears in the above-identified patent and that said Letters Patent is hereby corrected as shown below:

Claim 1, column 6, line 13, after "alkoxy" insert -- , --.

Signed and Sealed this

Fourth Day of November, 1986

[SEAL]

*Attest:*

DONALD J. QUIGG

*Attesting Officer*      *Commissioner of Patents and Trademarks*